HIGH-SPEED ELECTRONIC DIGITAL-TO-ANALOGUE CONVERTER SYSTEM

Filed April 2, 1953 2 Sheets-Sheet 1

INVENTORS.
HAROLD R. KAISER,
CLAUDE A. LANE,
WILFORD S. SHOCKENCY,
BY Seymour M. Rosenberg
ATTORNEY.

HIGH-SPEED ELECTRONIC DIGITAL-TO-ANALOGUE CONVERTER SYSTEM
Filed April 2, 1953 2 Sheets-Sheet 2
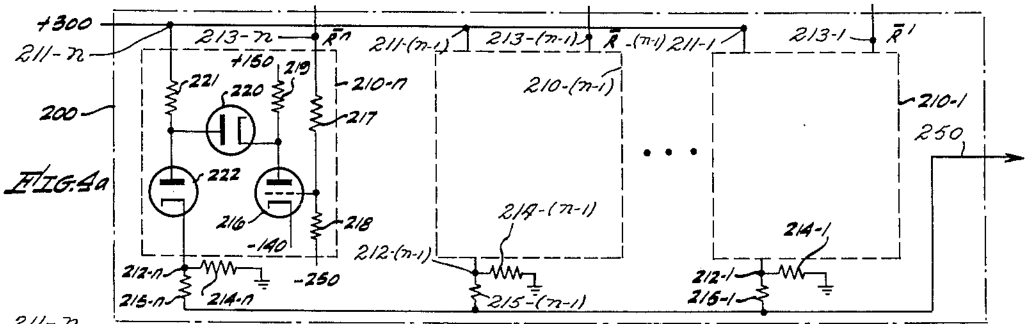
FIG. 4a
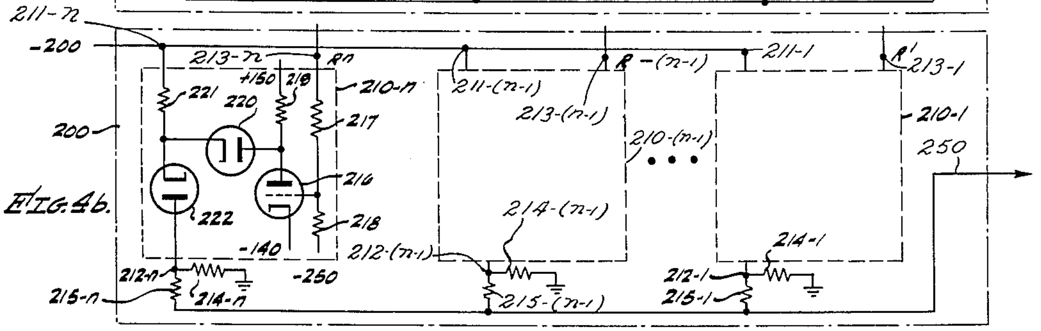
FIG. 4b
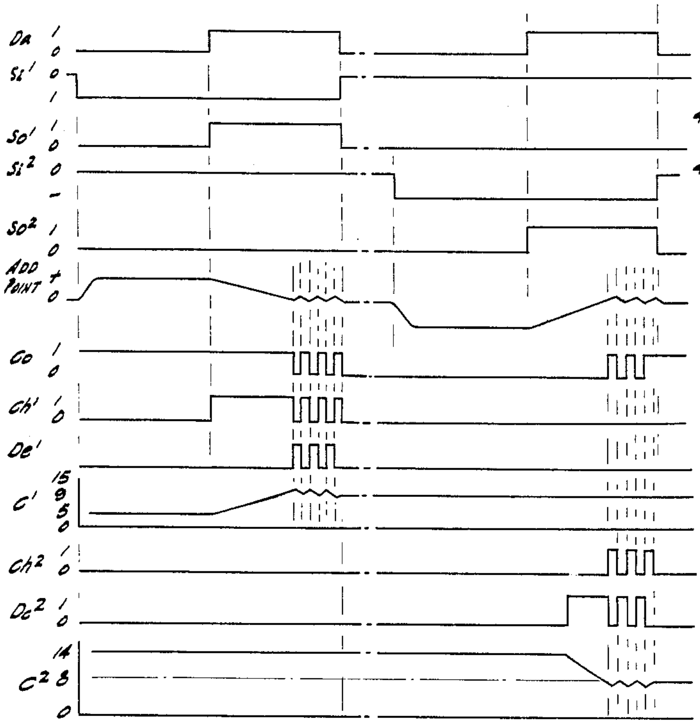
FIG. 6
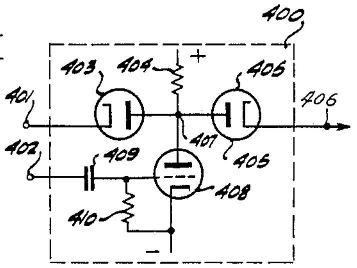
FIG. 5
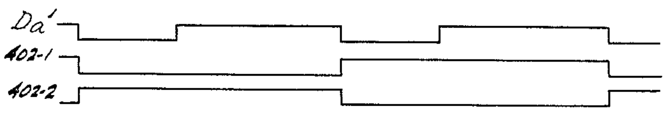
INVENTORS.
HAROLD R. KAISER,
CLAUDE A. LANE,
BY WILFORD S. SHOCKENCY,
Seymour M. Rosenberg
ATTORNEY.

United States Patent Office 2,736,889
Patented Feb. 28, 1956

2,736,889

HIGH-SPEED ELECTRONIC DIGITAL-TO-ANALOGUE CONVERTER SYSTEM

Harold R. Kaiser, Woodlands Hills, Claude A. Lane, Culver City, and Wilford S. Shockency, Torrance, Calif., assignors, by mesne assignments, to Hughes Aircraft Company, a corporation of Delaware

Application April 2, 1953, Serial No. 346,393

13 Claims. (Cl. 340—347)

The present invention relates to digital-to-analogue converter systems and, more particularly, to a high-speed electronic digital-to-analogue converter system for converting a plurality of applied digital signal sets to corresponding analogue output signals, the conversion being performed by changing the level of each analogue output signal until it becomes equal to the analogue equivalent of the corresponding applied digital signal set.

Digital-to-analogue converters of the general type provided by the present invention are essential components of any system wherein digital signals are utilized to control the operation of various electrical and mechanical devices. In a particular situation, for example, the converter of the present invention may be utilized in combination with a digital computer for translating the digital output signals produced by the computer into analogue signals which may be utilized to control such analogue devices as synchros, servos, and the like.

Several types of electronic digital-to-analogue converters have been utilized in prior art systems. In one type of converter the entire range of digital signal sets and corresponding analogue equivalents are continuously produced and compared with the digital signal set to be converted. When the digital signal set is found which corresponds to the set to be converted, the corresponding analogue signal is gated to an output circuit for utilization. A system of this general type is described in U. S. Patent Serial No. 2,533,242, entitled "Data Transformation System" by D. H. Gridley, issued December 12, 1950.

While the Gridley system may be adapted to convert a plurality of applied digital signal sets to corresponding analogue signals on a time-sharing basis, it is apparent that the speed of operation is greatly limited since it is necessary to compare the entire range of digital signal sets with each digital set to be converted. In addition, the Gridley system necessitates the provision of a coded record of the range of the digital signal sets and the corresponding analogue signal, the coded record being in the form of a perforated disk. It will be apparent from the discussion which follows that the coded record is unnecessary in other types of digital-to-analogue conversion systems, and that the requirement of the coded record unnecessarily complicates the converter and further limits its speed of operation.

In another type of digital-to-analogue converter the number to be converted is initially entered into a register comprising a plurality of flip-flops, one for each digit of the number. The flip-flops are utilized to control a decoding network which produces an analogue output signal corresponding to the setting of the register. One system of this type is described on pages 33–11 to 33–13 and in Fig. 7 of the article entitled "Continuous Variable Input and Output Devices" by J. P. Eckert, Jr. in vol. III of "Theory and Techniques for Design of Electronic Digital Computers," published June 30, 1948 by the Moore School of Electrical Engineering, University of Pennsylvania, and distributed by the Office of the Publication Board, Department of Commerce, Washington, D. C.

In the system described in the article by J. P. Eckert the flip-flops of the register are utilized to switch a corresponding plurality of constant current sources into an attenuator network, one flip-flop controlling each corresponding source. The attenuator network weights the current sources in accordance with the code established for setting the flip-flops and a linear summation of currents results which, acting across the output impedance of the network, produces an output signal which is the analogue equivalent of the register setting. An improved system of this general type, but which utilizes constant voltage sources rather than constant current sources, is described and claimed in copending U. S. patent application, Serial No. 239,077, entitled "Digital-to-Analog Converter" by Siegfried Hansen, filed July 28, 1951. In addition, another type of current-weighting converter is described in U. S. patent, Serial No. 2,610,295, entitled "Pulse Code Modulation Communication System" by R. L. Carbrey, issued September 9, 1952.

The disadvantage of current and voltage weighting converter systems of the above-described type is that the accuracy of the system is limited to the accuracy of the constant voltage sources. As a result, it is not possible to provide a highly accurate system of this type where the analogue output signal, and consequently the load conditions, must vary over a considerable range. While the voltage or current supplies may be well regulated at some points within the range they cannot be made to remain absolutely constant throughout the range.

The present invention discloses a high-speed electronic digital-to-analogue converter system which overcomes the above and other disadvantages of the prior art converter systems. According to the present invention the set of digital signals to be converted is initially entered into a flip-flop register, the setting of which is continuously translated into an equivalent analogue reference signal by means of a novel decoding circuit which requires neither constant current nor constant voltage sources. The reference signal is applied to a comparator circuit which compares the reference signal with a variable output signal produced in an analogue output circuit. The comparator produces signals $Co$ and $\overline{Co}$, respectively, indicating the positive and negative sense of the difference between the reference signal and the variable output signal. Signals $Co$ and $\overline{Co}$ are then utilized to control the analogue output circuit so that the variable output signal is changed until it becomes equal to the reference signal and thus becomes the analogue equivalent of the applied set of digital signals.

The novel decoding circuit of the present invention includes a current switch for each of the digits of the input signal set. Each current switch is controlled by a signal of an associated flip-flop of the register so that it produces a binary-weighted current only when the flip-flop signal is in a high-level state representing binary 1. It is not necessary that the flip-flop signals be very accurately regulated, as in the above-mentioned voltage and current weighting converter systems, since the current switches may be "opened" and "closed" by signals which have a considerable range within which they may be effective.

Another factor which adds considerably to the accuracy of the converter of the present invention is that the decoding circuit need not produce an accurate reference signal throughout an entire range of load conditions. The reference signal need only be accurate when the difference between the reference signal and the analogue output signal approaches 0 volts. As a result, each of the current switches may be accurately designed to provide a binary-weighted current for the 0-volt load conditions. In effect, then, the comparator circuit functions as a buffer circuit between the analogue load and the decoding circuit so that the voltage at the output of the decoding circuit is not influenced by a change in load conditions.

Where a plurality of digital sets are to be converted to corresponding analogue output signals an analogue output circuit is provided for each output signal and electronic switching circuits are introduced for selectively applying the output signals to the comparator circuit when the corresponding digital signal set is being converted. In one form, each of the analogue output circuits includes a storage capacitor which produces the above referred to variable output signal. Signals *Co* and $\overline{Co}$ then are utilized, respectively, to control the charging and discharging of the capacitor so that the output signal is changed until it becomes equal to the reference signal.

Accordingly, it is an object of the present invention to provide an electronic digital-to-analogue converter system which may be utilized to control analogue devices over a wide range of analogue values and corresponding load conditions with a high degree of accuracy.

Another object of the invention is to provide a converter system for converting a plurality of applied digital signal sets to corresponding analogue output signals, wherein the conversion is performed by changing the level of each analogue output signal until it becomes equal to the analogue equivalent of the corresponding applied digital signal set.

An additional object of the invention is to provide an improved digital-to-analogue decoding circuit which is adapted to accurately convert digital signals to corresponding analogue signals without the necessity of well-regulated current or voltage sources.

A further object is to provide a decoding circuit for translating an applied set of digital signals into a corresponding set of binary-weighted currents, the sum of which is an analogue output signal, each of the binary-weighted currents being produced or not produced in accordance with the "open" or "closed" condition of a corresponding current switch which is controlled by an associated digital signal.

Still another object of the invention is to provide an electronic digital-to-analogue converter system wherein an applied set of digital signals are continuously translated into a reference analogue signal, the converter system including a comparator circuit which produces signals *Co* and $\overline{Co}$, respectively, indicating the positive and negative sense of the difference between the reference signal and the analogue output signal, signals *Co* and $\overline{Co}$ being utilized to control the changing of the level of the analogue signal until the level thereof becomes equal to the reference signal.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
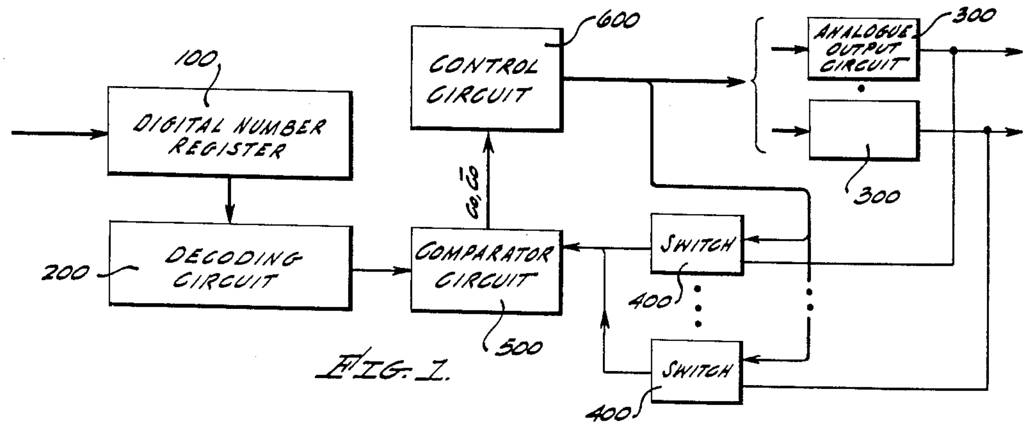
Fig. 1 is a block diagram of the basic embodiment of the digital-to-analogue converter of the present invention.

Fig. 4*a* is a schematic diagram of one form of the decoding circuit shown in Fig. 1;

Fig. 4*b* is a schematic diagram of another form of the decoding circuit shown in Fig. 1;

Fig. 5 is a schematic diagram of one form of the input switch shown in Fig. 1; and Fig. 6 is a composite diagram of the wave forms of signals appearing at various points in the embodiment of Fig. 1 during an illustrative digital-to-analogue conversion.

Referring now to Fig. 1, there is shown one embodiment of a digital-to-analogue converter system according to the present invention. As shown in Fig. 1 the converter system comprises: a digital number register 100 for receiving an applied set of digital input signals and producing corresponding output signals; a decoding circuit 200 for translating the output signals from register 100 into a corresponding analogue reference signal; a plurality of analogue output circuits 300, each producing an analogue output signal; a comparator circuit 500, responsive to the reference signal produced by circuit 200 and to an analogue output signal applied through one of a corresponding plurality input switches 400, for producing indicator signals *Co* and $\overline{Co}$ respectively indicating the positive and negative sense of the difference between the reference signal and the analogue output signal; and a control circuit 600 responsive to signals *Co* and $\overline{Co}$ for selectively actuating input switches 400 to apply an analogue output signal to comparator 500, and for actuating the corresponding analogue output circuit to change the level of its output signal until the output signal is equal to the reference signal, and thus is equal to the analogue equivalent of the applied set of digital signals.

Illustrative forms of circuits suitable for control circuit 600, analogue output circuits 300, decoding circuit 200, and input switches 400 are shown in Figures 2, 3, 4*a* and 4*b*, and 5, respectively; and these circuits are considered in detail below. Digital number registers of the type required for register 100 are well known in the computer art and may include a plurality of flip-flops or bistable multivibrators. Several suitable registers, for example, are described on pages 297 to 299 of "High-Speed Computing Devices" by Engineering Research Associates, published in 1950 by McGraw-Hill Book Company, Inc., New York and London. Suitable forms of comparator circuits suitable for use as comparator 500 are illustrated on pages 335 through 363 of vol. 19 of the M. I. T. Radiation Laboratory Series, entitled "Waveforms," published in 1949 by McGraw-Hill Book Company, Inc. In the circuit shown in Fig. 9.44 on page 360 of "Waveforms," for example, the reference and the applied analogue signal may be signals $e_1$ and $e_2$, respectively; signals *Co* and $\overline{Co}$ being then derived from anodes of the separate triodes of tube 6SL7.

It is convenient to consider the structure of control circuit 600 before considering the other circuits in detail because an understanding of control circuit 600 provides an over-all picture of the digital-to-analogue converter system. Control circuit 600 is mechanized according to logical equations, the equations being determined through a logical consideration of the manner in which the conversion is to be performed; consequently the circuit is more readily understood by first considering the manner in which the conversion is to be performed, then deriving the defining logical equations, and finally considering the details of the specific circuits.

It has been explained that during the conversion operation an analogue output circuit 300 is actuated by control circuit 600 to produce an analogue output signal which is continuously compared with a reference signal representing the analogue value of the digital number to be converted. Where a plurality of digital signals sets are to be converted, each analogue output circuit includes a storage element for retaining a substantially constant level output signal until the output circuit is again actuated by control circuit 600. In the particular embodiment of the invention which is to be described in detail, each analogue output circuit includes a storage capacitor as the storage element, the storage capacitor being charged and discharged, respectively, when the reference signal is greater and less than the capacitor output signal. In this case the capacitor output signal is the analogue output signal which is selectively applied through one of switches 400 to comparator circuit 500. It should be understood, however, that in lieu of capacitors many other types of storage elements may be utilized such as magnetic elements, cathode ray tubes, or mechanical stepping devices.

In the above discussion, signals $Co$ and $\overline{Co}$, produced by comparator 500, are considered as respectively indicating the positive and negative sense of the difference between the reference signal and an applied analogue output signal. In addition, signals $Co$ and $\overline{Co}$ may be defined as having levels representing binary 1 and 0, respectively, when the analogue output signal is less than the reference signal, and as having levels representing binary 0 and 1, respectively, when the analogue output signal is greater than the reference signal. The latter definition is utilized throughout the discussion of the logical equations which follow. It should be understood that the same structure may be defined as producing signals $Co$ and $\overline{Co}$ in either manner.

During each digital-to-analogue conversion period, then, a capacitor is charged when signal $Co$ is 1 and is discharged when signal $\overline{Co}$ is 1. It is possible, then, to define charging and discharging signals, designated hereinafter $Ch$ and $Dc$, respectively, as follows:

$$Ch=Co.Da$$
$$Dc=\overline{Co}.Da$$

where signal $Da$ is produced by control circuit 600 and has a 1-representing level during each digital-to-analogue conversion period.

In these equations the dot (.) represents the logical "and" so that signal $Ch$ assumes a 1-representing level when signal $Co$ "and" signal $Da$ are both in 1-representing states. Similarly, signal $Dc$ is 1 when signals $\overline{Co}$ and $Da$ are 1.

When a plurality of capacitors are to be charged and discharged during different digital-to-analogue conversion periods, it is necessary to add a switching signal to the above-indicated algebraic charging and discharging definitions. For this purpose an output switching signal $So^k$, produced by control circuit 600, is utilized; $k$ being an integer representing the particular switching signal. Where 4 analogue output circuits are utilized, for example, $k$ is any of the integers 1 through 4. With the inclusion of signal $So^k$, the charging and discharging functions then become:

$$Ch=Co.Da.So^k$$
$$Dc=\overline{Co}.Da.So^k$$

Since the charging of the capacitors in the analogue output circuits requires an amplifier which inverts or complements an applied input signal, it is necessary to utilize signal $\overline{Ch}$, the complement of $Ch$, to control the charging of the corresponding storage capacitor. The algebraic equation defining $\overline{Ch}$, then, is the complement of that defining $Ch$, and appears as follows:

$$\overline{Ch}=\overline{Co}+\overline{Da}+\overline{So^k}$$

where the plus sign (+) represents the logical "or" so that signal $\overline{Ch}$ is 1 if one or more of signals $\overline{Co}$, $\overline{Da}$, and $\overline{So^k}$ are 1.

Figure 2:
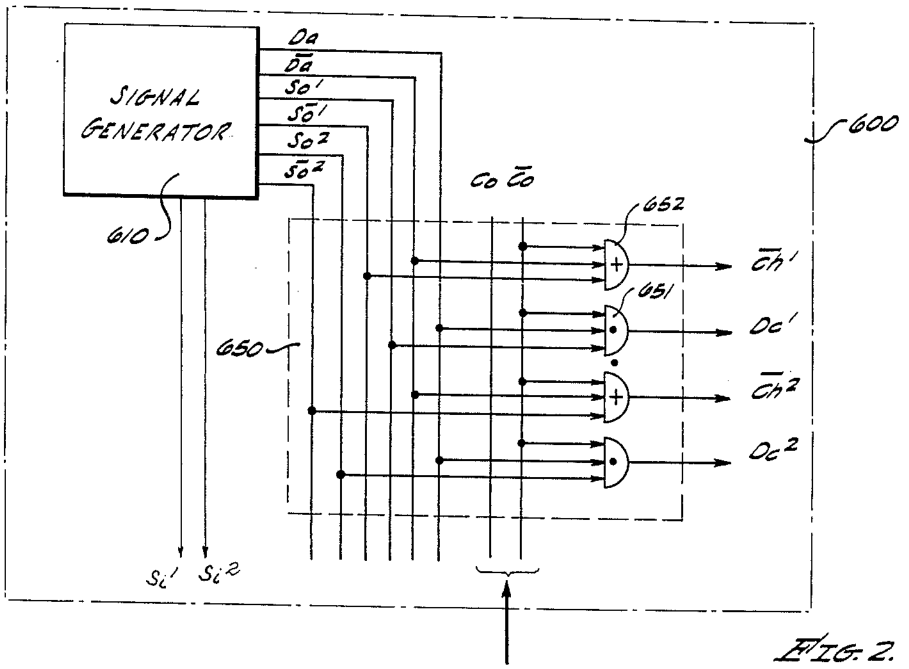
Fig. 2 is a schematic diagram of one form of the control circuit shown in Fig. 1.

One form of circuit suitable for producing signals $\overline{Ch}$ and $Dc$ is illustrated in Fig. 2 by a matrix 650 which is included in control circuit 600. For simplicity, matrix 650 is mechanized to provide only two sets of control signals for controlling the charging of two capacitors according to digital input signals, it being understood that a considerably greater number of capacitors may be controlled in the same manner. Set (1) of the functions, appearing below, defines control signals $\overline{Ch^1}$ and $Dc^1$ which control the charging and discharging of a first capacitor; and set (2) defines control signals $\overline{Ch^2}$ and $Dc^2$ controlling the charging and discharging of a second capacitor. Matrix 650, then, is mechanized according to the following algebraic equations:

(1)
$$\overline{Ch^1}=\overline{Co}+\overline{Da}+\overline{So^1}$$
$$Dc^1=\overline{Co}.DaSo^1$$

(2)
$$\overline{Ch^2}=\overline{Co}+\overline{Da}+\overline{So^2}$$
$$Dc^2=\overline{Co}.DaSo^2$$

Referring again to Fig. 2, it will be noted that a signal generator 610 produces signals $Da$, $\overline{Da}$, $So^1$, $\overline{So^1}$, $So^2$, and $\overline{So^2}$, the waveforms of signals $Da$, $So^1$ and $So^2$ being illustrated in Fig. 6, where the other waveforms shown are those which occur during a particular conversion operation which is described in detail below. Signal generator 610 is not shown in detail, since such circuits are well known in the art.

Each of the "and" functions of the equations of equation set (1) and set (2) above is provided by an "and" circuit in matrix 650. Thus, "and" function $\overline{Co}.Da.So^1$ is provided by "and" circuit 651 having signals $\overline{Co}$, $Da$ and $So^1$ applied to separate input terminals. In a similar manner each "or" function is provided by an "or" circuit such as "or" circuit 652 producing the function $$\overline{Ch^1}=\overline{Co}+\overline{Da}+\overline{So^1}$$

"or" circuit 652 having signals $\overline{Co}$, $\overline{Da}$ and $\overline{So^1}$ applied to separate input terminals.

Figure 3:
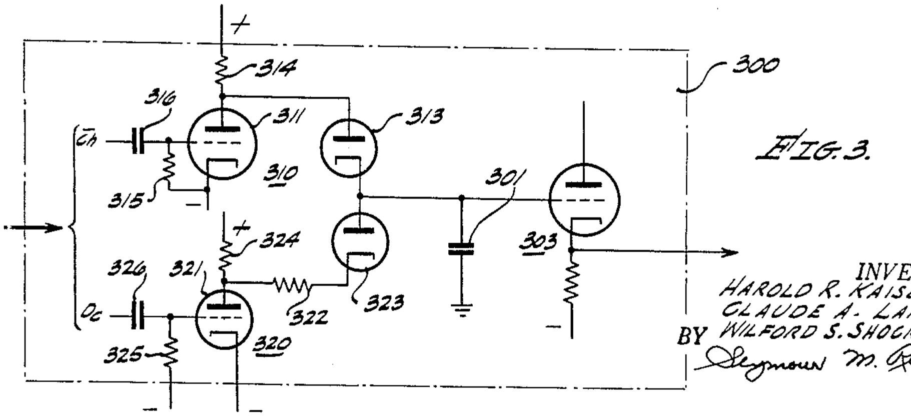
Fig. 3 is a schematic diagram of one form of the analogue output circuit shown in Fig. 1.

One form of analogue output circuit for charging and discharging a storage capacitor under the control of signals $\overline{Ch}$ and $Dc$ is shown in Fig. 3, wherein it is noted that the output circuit comprises: a storage capacitor 301; a cathode-follower output circuit 303; a charging circuit 310, including a triode 311 and a diode 313; and a discharging circuit 320, including a triode 321 and a diode 323.

The anode of triode 311 is connected to the anode of diode 313 and is coupled through a loading resistor 314 to a source of positive potential, not shown. The grid and cathode of triode 311 are coupled together through a resistor 315, the cathode being also connected to a source of negative potential, not shown. Signal $\overline{Ch}$ is applied to the grid of triode 311 through a coupling capacitor 316 and has a 1-representing level such that triode 311 conducts heavily when signal $\overline{Ch}=1$ and signal $Ch=0$. Under these conditions, the anode voltage of triode 311 is sufficiently negative to bias off diode 313 so that storage capacitor 301 cannot charge.

The 0-representing level of signal $\overline{Ch}$ is sufficiently negative so that the anode voltage of triode 311 is caused to rise above the highest charging potential of capacitor 301. The negative level of signal $\overline{Ch}$ may, for example, be low enough to cut off triode 311. Thus, when signal $\overline{Ch}=0$, and signal $Ch=1$, diode 313 is caused to conduct and capacitor 301 charges.

Triode 321, in discharging circuit 320, has its anode coupled through current-limiting resistor 322 to the cathode of diode 323, and through load resistor 324 to a source of positive potential, not shown. The grid of triode 321 is coupled through a grid resistor 325 to a first source of negative potential while its cathode is connected to a second source of negative potential, neither of the negative potential sources being shown. Signal $Dc$ is applied to the grid of triode 321 through a coupling capacitor 326. Signal Dc, and the signals produced by the sources applied to the anode, grid, and cathode of triode 321 are selected so that with signal Dc in a 0-representing, or low-level state, triode 321 is cut off or only slightly conducting. As a result, the anode potential of triode 321 becomes sufficiently high so as to bias off diode 323, preventing the discharge of capacitor 301. The 1-representing, or high-level state of signal Dc, is selected so that triode 321 is caused to conduct sufficiently to lower the anode potential thereof to ground potential; thus making it possible for capacitor 301 to discharge to zero potential.

It is apparent, then, that the conditions $Ch=1$ ($\overline{Ch}=0$) and $Dc=1$, result in the charging and discharging, respectively, of capacitor 301; and that capacitor 301 is neither charged nor discharged if both of signals $Ch$ and Dc are 0. Thus, if it is not a digital-to-analogue period ($Da=0$), or if the particular output circuit is not in operation ($So^k=0$), the corresponding capacitor is isolated from charging and discharging circuits and serves as an analogue memory. The period during which the signal produced by a capacitor reliably represents the desired analogue signal depends upon the leakage characteristic of the particular capacitor as well as the effectiveness of the diode switching circuits in the output circuit.

Consider now the operation of the system of Fig. 1 during a digital-to-analogue conversion, reference being made to Fig. 6 wherein the waveforms appearing at various points in the system of Fig. 1 during an illustrative conversion operation are shown. In the operation which is to be described, it will be assumed that the digital-to-analogue converter includes at least two analogue output circuits having first and second capacitors C1 and C2, corresponding to capacitor 301 in Fig. 3 for producing signals $C^1$ and $C^2$, respectively. Capacitors C1 and C2 are to be charged so that signals $C^1$ and $C^2$ finally represent the analogue equivalents of the binary numbers 1001 (9) and 1000 (8), respectively. It will also be assumed that signals $C^1$ and $C^2$ are initially at levels representing the analogue equivalents of the binary numbers 0101 (5) and 1110 (14), respectively.

During the separate periods that the analogue output signals are developed across capacitors C1 and C2, signals $C^1$ and $C^2$ are applied through corresponding input switches to the input circuit of comparator 500, under the control of two input switching signals $Si^1$ and $Si^2$, respectively, signals $Si^1$ and $Si^2$ being produced by signal generator 610 in control circuit 600. The input switching signals are assumed, for the purpose of illustration, to be negative-going signals, since a negative signal is effective to close an input switch of the type shown in Fig. 5, the circuit of Fig. 5 being described in detail below.

Referring now to Fig. 6, it will be noted that input switching signal $Si^1$ becomes negative prior to the time that output switching signal $So^1$ rises to a 1-representing level. As is explained in detail below, this is to allow sufficient time for the application of signal $C^1$ (also shown in Fig. 6) through the corresponding input switch to the input circuit of comparator 500. During the initial period of operation, then, the signal appearing at the input circuit of comparator 500 assumes a level corresponding to the difference between the reference signal of decoding circuit 200 and signal $C^1$; comparator 500 responding to the sense of the difference signal and producing corresponding signals Co and $\overline{Co}$. In the particular operation which is illustrated signal $C^1$ represents an analogue signal having a level (5 units) which is lower than the analogue equivalent of the binary input number (1001), and consequently the difference signal is positive and signals $Co$ and $\overline{Co}$ have 1 and 0 representing levels, respectively.

It should be noted, at this point, that the initial period described above may be utilized to shift the binary number to be converted into register 100, although a parallel type of entry is equally suitable. Where the binary number is shifted in serially during the initial period of operation, the potential appearing at the input circuit of comparator 500 does not rise continuously, but will assume the final difference potential shown with substantially no delay after the binary number has been completely shifted into register 200.

In observing waveforms D$a$, So$^1$ and C$o$ of Fig. 6, it will be noted that at the time that signal D$a$ first becomes 1, signals C$o$ and So$^1$ are 1 so that the condition $Da.Co.So^1=1$ is satisfied and, consequently, charging signal $Ch^1$ becomes 1, or signals $\overline{Ch^1}=\overline{Da}+\overline{Co}+\overline{So^1}$ becomes 0. As a result, capacitor C1 is continuously charged until the difference potential appearing at the input circuit of comparator 500 assumes a negative sense and signals C$o$ and $\overline{Co}$ become 0 and 1, respectively.

As soon as signal $\overline{Co}$ is 1 the condition $Da.\overline{Co}.So^1=1$ is satisfied and signal Dc becomes 1. Capacitor C1 is then discharged until the difference potential again assumes a positive sense. Thereafter, capacitor C1 is alternately charged and discharged as the sense of the difference signal becomes positive and negative, respectively; the final value of signal C1 representing the analogue equivalent of binary 1001 within an error range which is less than the analogue equivalent of one-half of the least significant binary digit.

The amount that the analogue output signals may deviate from the desired conversion signal is determined by the hysteresis characteristic of comparator 500 and other delay or lag characteristics inherent in the switching circuits. The hysteresis characteristic of comparator 500 is due to the difference between its setting-to-1 and setting-to-0 input signal level. Thus, the difference signal appearing at the input circuit of comparator 500 must become positive by a predetermined amount before the comparator is set to 1, and must become negative by a predetermined amount before the comparator is set to 0. It is the hysteresis characteristic of comparator 500, then, which causes the analogue output signal to alternately rise above and fall below the signal level corresponding to the exact analogue equivalent of the binary input number. In practical applications, however, it has been found that the hysteresis characteristic of comparator 500 does not influence the accuracy of the conversion system until it is attempted to accurately convert a considerable number of binary digits—as for example twelve or thirteen digits. The ultimate test as to whether the hysteresis characteristic is a limiting factor is whether or not the hysteresis range approaches the order of magnitude of the analogue equivalent of the least significant binary digit.

It should now be apparent that the reference signal produced by decoding circuit 200 need not be perfectly accurate until the difference signal appearing at the input circuit of comparator 500 becomes of the order of magnitude of 0 volts. This feature alone makes it possible to achieve a higher accuracy than is possible in prior-art systems, even those utilizing a current-weighting type of decoding circuit of the type described above. With the improved decoding circuit of the present invention, however, an additional degree of accuracy is provided owing to the elimination of possible errors due to the variations of current or voltage sources. The reason for this will be more fully understood after the decoding circuits of the present invention shown in Figs. 4$a$ and 4$b$ are described in detail.

Referring now to Fig. 4$a$, decoding circuit 200 comprises a plurality of current switches 210; $n$ switches being shown corresponding to the $n$ flip-flops in register 200, respectively. Each of the current switches 210–$j$ ($j$ being any of the integers $l$ through $n$) has an input terminal 211–$j$, an output terminal 212–$j$, and a control terminal 213–$j$. A source of positive potential, not shown, is connected to input terminal 211–$j$ and output terminal 212–$j$ is coupled to ground through a first current-weighting resistor 214–*j*. Signal $\overline{R}^j$, produced by flip-flop $R_j$, is applied to control terminal 213–*j* and is effective to "open" and "close" the current switch in a manner to be described. Output terminal 212–*j* is also coupled through a second current-weighting resistor 215–*j* to a common output line 250, line 250 being connected to the input circuit of comparator 500.
input circuit of comparator 500.

Each of current switches 210–*j* is "open" when the signal $\overline{R}^j$ applied to control terminal 213–*j* is at a high level, indicating that the corresponding flip-flop registers a 0, and is "closed" when signal $\overline{R}^j$ is at a low level, indicating that the corresponding flip-flop registers a 1. When signal $\overline{R^j}=1$, and current switch 210–*j* is open, no current passes through either of current-weighting resistors 214–*j* or 215–*j*; whereas when signal $\overline{R^j}=0$, current switch 210–*j* is closed and current flows through resistors 214–*j* and 215–*j*.

Resistors 214–*j* and 215–*j* are selected so that when the input conversion is completed the current through resistor 215–*j* has a value corresponding to the binary weight of the digit stored in flip-flop $Rj$. Since the voltage on output line 250 is 0 volts at the end of the conversion period, the values of resistors 215–*j* are readily computed on the basis of a given source voltage and current switch impedance. The manner of computing the values of the current-weighting resistors is fully explained after a specific form of current switch is considered in detail.

In one form, each of current switches 210–*j* may be of the type illustrated for current switch 210–*n*. As shown in Fig. 4*a*, current switch 210–*n* includes a triode 216 having its control grid connected through a resistor 217 to control terminal 213–*n* and connected through a resistor 218 to a source of negative biasing potential, not shown. The biasing potential is selected so that with signal $\overline{R}^n$ in its high-level state representing binary 1 triode 216 conducts, and with signal $\overline{R}^n$ in its low-level state triode 216 is cut off.

The anode of triode 216 is coupled through a load resistor 219 to a source of positive potential, not shown, the anode being also coupled to the cathode of a diode 220. The anode of diode 220 is coupled through a resistor 221 to input terminal 211–*n*. The cathode of triode 216 is connected to a source of negative potential, not shown; the negative potential source being selected so that the conduction of triode 216 lowers the potential appearing at the anode of diode 220 to a negative value. Thus triode 216 and its associate circuitry may be considered as a biasing voltage circuit responsive to high-level $\overline{R}^n$ signals for producing a biasing voltage which is applied to diode 220. The anode of diode 220 is also connected to the anode of a second diode 222 which has its cathode connected to output terminal 212–*n*.

In operation, whenever signal $\overline{R}^n$ is high and triode 216 is conducting the potential appearing at the anode of diodes 220 and 222 is sufficiently negative to bias off diode 222 so that it does not conduct. Thus, the current switch is "open" when signal $\overline{R}^n$ represents binary 1, and flip-flop $Rn$ registers 0.

When signal $\overline{R}^j$ is at a low level, indicating that flip-flop $Rn$ registers a 1, triode 216 is cut off, with the result that the anode potential thereof rises to a level which is high enough to bias off diode 220. As a result, diode 222 is no longer biased off and conducts, allowing a binary-weighted current to flow through resistor 215–*n*, which constitutes closure of the switch.

Since a binary-weighted current passes through each current switch 210–*j* when it is closed under the control of the associated flip-flop signal $\overline{R}^j=0$, it is apparent that the total current passing through all of the current-weighting resistors 215 corresponds to the binary setting of register 200. It should also be apparent that the sum of these currents is present in lead 250 and is the reference signal above referred to. Thus each of the current switches 210–*j* and its corresponding current-weighting resistors 214–*j* and 215–*j* may be considered together as forming a current-weighting circuit. This current-weighting circuit is responsive to a corresponding one of the digital input signals, represented by the output signal of the corresponding flip-flop $\overline{R}^j$ of the digital number register 100 of Fig. 1, for producing a unidirectional output current on common output lead 250. This output current corresponds in magnitude to the weight and value of the corresponding digital input signal.

In one operative embodiment of the invention, register 200 includes a current switch of the type shown in Fig. 4*a*, switch 210–*n*; the potential values being those indicated in Fig. 4*a*, and the following circuit components being employed:

Triode 216 is one-half of double triode 12AY7
Resistor 217—100K ohms
Resistor 218—120K ohms
Resistor 219—150K ohms
Diode 220—one-half of tube type 5726
Resistor 221—100K ohms
Diode 222—other-half of tube 5726

With this type of current switch, the values of resistors 214–*j* and 215–*j* are determined by assuming that the voltage drop across diode 222 when conducting is negligible and that the voltage at output line 250 is 0 volts. The current which passes through resistors 215–*j*, then must be weighted according to the corresponding binary place. Thus, if it is assumed that the conventional binary weighting is utilized and that resistor 215–*n* is selected to pass one milliampere of current when switch 210–*n* is closed and line 250 is at 0 volts, resistor 215–(*n*–1), must pass one-half milliampere of current under the same conditions, and so forth. Resistor 215–*n* is made to pass one milliampere of current by making both it and resistor 214–*n* 100K ohms, the parallel impedance thereof with respect to ground or 0 volt potential being 50K ohms. It is readily seen, then, that with +300 volts applied to resistor 221, two milliamperes of current passes through resistor 221 causing a voltage drop of 200 volts, and that one milliampere of current passes through each of resistors 214–*n* and 215–*n*.

For uniformity, each of the other resistors 215–*j* may be 100K ohm resistors, resistors 214–*j* being varied in order to provide the correct binary-weighted current through resistor 215–*j*. Assuming that resistor 215–(*n*–1) is 100K ohms, the voltage drop thereacross must be 50 volts to provide a binary-weighted current is one-half milliampere. This means that the voltage drop across the corresponding resistor 221 must be 250 volts to make up the difference between 50 volts and the 300 volt supply. Since resistor 221 is 100K ohms, two and one-half milliamperes of current must pass through diode 220 when the switch is closed, and two milliamperes of current must pass through resistor 214–(*n*–1), since only one-half milliampere passes through resistor 215–(*n*–1). Resistor 214–(*n*–1) must be 25K ohms since the voltage drop thereacross is 50 volts and the current through the resistor is two milliamperes. The lower place current-weighting resistors 214–*j* may then be computed in the same manner, resistor 214–(*n*–1), for example, being 10K ohms.

Another form of decoding circuit 200 is shown in Fig. 4*b*, wherein the binary-weighted currents are negative currents, and consequently the reference signal appearing on output line 250 has a negative amplitude corresponding to the setting of register 100. The circuit components shown in Fig. 4*b* are designated by reference characters corresponding to the designation of like components in the decoding circuit of Fig. 4*a*, and the connections in the circuit are the same as those in Fig. 4*a* except that diodes 220 and 222 have their electrodes connected in a reverse manner. All of the biasing voltages are the same, but the source voltage applied to input terminal 211–j is −200 volts instead of +300 volts, as shown in Fig. 4a.

It will be noted that signals $R^n$, $R^{(n-1)}$, . . . $R^1$ are utilized to control the corresponding current switches so that when flip-flop $Rn$, for example, is in its 0 state, triode 216 is cut off and diode 220 is forward biased raising the potential appearing at the cathode of diode 220 sufficiently to cut off conduction through diode 222. When flip-flop $Rn$ is in a 1 state triode 216 conducts, biasing off diode 220 and allowing current to pass through diode 220. The values of resistors 214–j and 215–j are computed in the same manner explained above.

The high-speed electronic operation of the digital-to-analogue converter of the present invention makes it practical to perform a considerable number of conversions on a time-sharing basis. A multiple conversion may be provided by including an analogue output circuit for each of the conversions desired and an input switch for selectively connecting each of the analogue output circuits to the comparator circuit. During the time that the energy in a storage element in an analogue output circuit is changed in the above-described manner, its signal is applied through a corresponding switch to the input circuit of comparator 500.

One type of input switch suitable for providing the high-speed electronic switching operation required in a multiple conversion system is illustrated in Fig. 5. Referring now to Fig. 5, it is noted that input switch 400 includes first and second input terminals 401 and 402 for receiving the analogue signal to be converted and a control signal produced by control circuit 600, respectively. Input terminal 401 is connected to cathode of a first diode 403 having its anode coupled through a load resistor 404 to a source of positive potential, not shown; the potential applied to resistor 404 being greater than the full-scale level of the analogue input signal. The anode of diode 403 is also connected to the anode of a second diode 405 which has its cathode connected to an output terminal 406; output terminal 406 being connected to the input circuit of comparator 500. The junction 407 of diode 403 and 405 is connected to the anode of a triode 408 having its grid coupled through coupling capacitor 409 to input terminal 402, the grid of triode 408 being also coupled through a load resistor 410 to its cathode. The cathode of triode 408 is connected to a source of negative potential, not shown.

In operation, triode 408 is normally conducting so that junction 407 is held at a negative potential which biases diode 403 and 405 so that they are nonconducting and, in effect, switch 407 is "open." When a negative signal is applied to input terminal 402, triode 408 is cut off, diode 403 becomes forward biased, and junction 406 rises to a value which is substantially equal to the value of the analogue signal applied to input terminal 401, since the potential drop across diode 403 is negligible. The signal appearing at junction 406 then is transmitted through diode 404, with substantially no distortion, to the input circuit of comparator 500.

Where a plurality of input switches of the type described above are utilized, a short period is allowed prior to each input conversion to insure that the output signal of the corresponding switch rises to the level of the associated analogue input signal. The rise of the switch output signal may, for example, be delayed due to shunt capacity across the parallel-connected switches. A set of typical waveforms illustrating the operation of two of a plurality of input switches, during two input conversions is shown in Fig. 6.

Waveform $Da'$, shown in Fig. 6, corresponds to signal $Da$ discussed above except that it is periodic. Waveforms 402–1 and 402–2 correspond to signals $Si^1$ and $Si^2$ as previously described and represent the signals applied to input terminal 402 of two switches 400–1 and 400–2, respectively. It will be noted that waveform 402–1 becomes negative, closing switch 400–1, a short interval prior to the first high-level portion of signal $Da'$, while waveform 402–2 becomes negative a short time prior to the second high-level portion of signal $Da'$. Each of signals 402–1 and 402–2 then remains negative throughout its corresponding conversion period.

Since the conversion system operates in the same manner where a plurality of digital signal sets are to be converted as where only one set is converted, it is not deemed necessary to consider the operation of a multiple conversion system in detail.

From the foregoing description it is apparent that the present invention provides a high-speed electronic digital-to-analogue converter system which may be utilized to control analogue devices over a wide range of load conditions with a high degree of accuracy. Part of the improvement in the accuracy is due to the novel arrangement whereby a comparator circuit functons as a buffer between the load and the current-weighting decoding circuit, and part of the improvement is in the novel decoding circuit itself since the decoding circuit requires no well-regulated current or voltage sources.

While specific forms of circuits suitable for use as decoding circuit 200, control circuit 600, analogue output circuits 300 and input switches 400 have been illustrated in detail it should be understood that the basic concept of the invention is not so limited. Decoding circuit 200, for example, may be replaced by a constant current or constant voltage type of decoding circuit, although with the disadvantages discussed above. In addition, analogue output circuits may be devised which operate directly in response to signals $Ch$ and $Dc$ without an inversion of signal $Ch$. Furthermore, there are many other arrangements suitable for control circuit 600.

What is claimed as new is:

1. An electronic converter for developing an analogue output signal corresponding to an applied set of N digital input signals by changing the level of a variable output signal until it becomes equal to the analogue equivalent of the digital input signals, said converter comprising: a register including N flip-flops for receiving said digital input signals and producing N corresponding output signals; first means coupled to said register and responsive to said output signals for producing a reference signal having a level equal to the analogue equivalent of the N digital input signals in said register; second means for producing a variable analogue output signal, said second means including a storage capacitor for producing said variable output signal, and charging and discharging circuits coupled to said storage capacitor; third means coupled to said first means and to said second means and responsive to said reference signal and to said variable output signal for producing signals $Co$ and $\overline{Co}$ when said reference signal is greater and less than said variable output signal, respectively; and fourth means coupling said second and third means for actuating said second means to increase and decrease the level of the variable output signal in response to signals $Co$ and $\overline{Co}$, respectively, said fourth means including means for producing a charging signal $Ch$ and a discharging signal $Dc$, said charging circuit being responsive to signal $Ch$ to increase the level of said variable output signal in said capacitor and said discharging circuit being responsive to signal $Dc$ to decrease the level of said variable output signal.

2. The converter defined in claim 15 wherein said fourth means includes signal generating means for producing signals $Da$ and $\overline{Da}$ having one and zero-representing levels, respectively, during the formation of the analogue output signal and having zero and one-representing levels, respectively, at all other times; wherein said fourth means also includes a logical "and" circuit and a logical "or" circuit coupled to said third means and said signal generating means and responsive to signals $\overline{Co}$, D$a$, and $\overline{Da}$ for producing signals $\overline{Ch}$ and D$c$, said "and" circuit being responsive to signals $\overline{Co}$ and D$a$ for producing signals D$c$, and said "or" circuit being responsive to signals $\overline{Co}$ and $\overline{Da}$ for producing signals $\overline{Ch}$; and wherein said second means also includes means responsive to signal $\overline{Ch}$ for producing an amplified signal C$h$ representing the complement of signal $\overline{Ch}$, signals C$h$ and D$c$ then becoming effective to cause said capacitor to increase and decrease the level of said output signal, respectively.

3. A digital-to-analogue converter for converting a set of digital input signals to a corresponding analogue output signal, said converter comprising: a decoding circuit responsive to the digital input signals for producing an analogue reference signal having a level corresponding to the set of digital input signals, said decoding circuit including a plurality of current switches, one for each of the digital input signals, and a corresponding plurality of sets of current-weighting resistors, each of said resistor sets being selected so that the amount of current which may pass through the corresponding current switch represents the analogue equivalents of the corresponding input signal, each of said current switches being operable in response to the application of a 1-representing digital input signal to allow the passage of a digitally-weighted amount of current through the corresponding resistor set, the sum of all currents passing through said resistor sets corresponding to said reference signal, each of said current switches having a current-gating diode and a biasing diode, said biasing diode having a first electrode connected to the corresponding first electrode of said current-gating diode, said current-gating diode having a second electrode connected to the corresponding set of current-weighting resistors, each of said current switches also including first means coupled to the second electrode of said biasing diode and operable through said biasing diode to prevent conduction through said current-gating diode when the corresponding digital signal is a 0-representing signal, and including second means coupled to said current-gating diode for applying a current source to said current-gating diode, said current-gating diode thereby passing current to said corresponding set of current-weighting resistors when said corresponding digital signal is a 1-representing signal; an analogue output circuit for producing a variable output signal, said output circuit being operable to vary said output signal until it is equal to said reference signal; a comparator coupled to said decoding circuit and said analogue output circuit and responsive to said reference signal and to said variable output signal for producing a two-level signal indicating the sense of the difference between the reference signal and the variable output signal, said two-level signal having first and second levels when said reference signal is greater and less than said variable output signal, respectively; and a control circuit coupling said output circuit and said comparator and being operable to actuate said output circuit to vary said variable output signal until it becomes equal to said reference signal, said control circuit including means for increasing and decreasing the level of said variable output signal in response to said first and second levels of said two-level signal, respectively.

4. In an electronic system for converting a set of digital input signals to an analogue output signal, a decoding circuit for producing a reference signal having a level equal to the analogue equivalent of the digital input signals, said decoding circuit comprising: a plurality of current switches, one for each of said digital input signals; a corresponding plurality of pairs of current-weighting resistors connected to said current switches, respectively; each of said current switches including first and second unilateral devices, each device having anode and cathode electrodes, one electrode of said first device being connected to the same electrode of said second device in the corresponding current switch, each of said current switches also including control means responsive to the corresponding digital input signal for preventing conduction through said first device, said control means being coupled to, and operable through, said second device; each of said pairs of resistors including first and second resistors, each resistor having one end connected to the other electrode of the corresponding first unilateral device, said resistors being selected so that said first resistor may pass a weighted current representing the analogue equivalent of said corresponding digital input signal, the sum of all currents through said first resistors being the reference signal; and means for applying a current source to said one electrode of said first unilateral devices, said first devices passing a weighted current to the corresponding first resistor when the corresponding digital input signal is a 1-representing signal and said first devices being non-conducting when said corresponding digital input signal is a 0-representing signal and said control means is operable through the corresponding second unilateral device.

5. The decoding circuit defined in claim 9 wherein said one electrode of said devices is said anode electrode and said other electrode is said cathode electrode and wherein said control means includes a triode having an anode, a cathode and a control grid, the corresponding digital input signal being applied to said control grid, and the anode of said triode being connected to the cathode of said second unilateral device, said triode being operable in response to the 0-representing level of the corresponding digital input signal to forward bias said second unilateral device thereby effecting the application of a conduction-preventing signal to said first unilateral device, and said triode being operable in response to the 1-representing level of the corresponding digital input signal to back bias said second unilateral device thereby effecting the application of a forward-biasing signal to said first unilateral device, allowing a positive current, corresponding to said digital input signal, to pass through said first unilateral device.

6. The decoding circuit defined in claim 9 wherein said one electrode of said devices is said cathode electrode and said other electrode is said anode electrode and wherein said control means includes a triode having an anode, a cathode and a control grid, the corresponding digital input signal being applied to said control grid, and the anode of said triode being connected to the anode of said second unilateral device, said triode being operable in response to the 0-representing level of the corresponding digital input signal to forward bias said second unilateral device thereby effecting the application of a conduction-preventing signal to said first unilateral device, and said triode being operable in response to the 1-representing level of the corresponding digital input signal to back bias said second unilateral device thereby effecting the application of a forward-biasing signal to said first unilateral device, allowing a negative current to pass through said first unilateral device corresponding to said digital input signal.

7. A digital-to-analogue decoding circuit for translating an applied set of digital input signals into an output signal having a level equal to the analogue equivalent of the digital input signals, said decoding circuit comprising: a plurality of current switches corresponding to said digital input signals, respectively; a corresponding plurality of current-weighting impedances connected to said current switches, respectively; and means for applying a current source to said current switches; said current switches being operable in response to the 1-representing level of the corresponding digital input signal for electrically coupling said current sources applying means to the corresponding current-weighting impedance, said corresponding impedance thereby producing a weighted current representing the analogue equivalent of said corresponding digital input signal, the sum of all currents through said current-weighting impedances constituting said output signal; each of said current switches including a first unilateral device having one electrode connected to said current source applying means and the other electrode connected to said current-weighting impedance, and each of said current switches including a control circuit coupled to said first unilateral device for preventing conduction through said first device when said corresponding digital input signal is a 0-representing signal, said control circuit including a second unilateral device connected to said first unilateral device and a biasing circuit coupled to said second unilateral device for producing a conduction-preventing signal when said corresponding digital input signal is a 0-representing signal, said conduction-preventing signal being applied through said second unilateral device to said first unilateral device, preventing conduction through said first device.

8. An electronic conversion system for forming M analogue output signals corresponding to M selectively applied sets of digital input signals, where M is an integer; said system comprising: first means for producing an analogue reference signal corresponding to the applied set of digital input signals; M second means for producing variable output signals, each of said second means being selectively operable for producing an analogue output signal corresponding to the applied set of digital input signals, and each of said second means including a storage capacitor for producing and storing said analogue output signal; third means coupled to said first means and second means and responsive to said reference signal and to an applied output signal for producing comparison signals $Co$ and $\overline{Co}$ when said reference signal is respectively greater and less than the applied output signal; fourth means coupled to said second and third means and operable in response to control signals for electrically applying said output signals to said third means during the time that the corresponding second means is made operable; fifth means coupling said second means and said third means for producing said control signals to selectively actuate said third means to increase and decrease the level of the corresponding variable output signal in response to signals $Co$ and $\overline{Co}$, respectively, until said variable output signal constitutes said analogue output signal, said fifth means including signal generating means and matrix means, said signal generating means producing control signals $Da$ and $\overline{Da}$ having 1 and 0-representing levels, respectively, during the formation of said analogue output signals, and having 0 and 1-representing levels, respectively, at all other times, said signal generating means also producing M control signals $So^k$ for actuating corresponding ones of said second means where $k$ is an integer indicating the particular second means which is actuated, and said matrix means producing M pairs of control signal $\overline{Ch}^k$ and $Dc^k$ for controlling the charging and discharging, respectively, of said capacitors, said matrix means including M logical "and" circuits and M logical "or" circuits, each of said "and" circuits being responsive to signals $Da$ and $\overline{Co}$, and a corresponding one of said M signals $So^k$ for producing a corresponding one of signals $Dc^k$, and each of said logical "or" circuits being responsive to signals $\overline{Da}$ and $Co$, and a corresponding one of said M signals $\overline{So}^k$ for producing a corresponding one of signals $\overline{Ch}^k$.

9. A digital-to-analogue converter for converting a set of N digital input signals to an analogue output signal, said converter comprising: decoding circuit means responsive to the N digital input signals for producing a corresponding reference signal having a level equal to the analogue equivalent of the digital input signals, said decoding circuit means including N corresponding current-weighting circuits, each of said current-weighting circuits being responsive to a corresponding one of the N digital input signals for producing an output current, the sum of the output currents produced by said current-weighting circuits representing said reference signal, each of said current-weighting circuits having a current switch and a set of current-weighting resistors, each of said current switches including a gating diode coupled to said set of current-weighting resistors and responsive to a biasing signal for selectively gating a current through said set of resistors, a biasing circuit responsive to said corresponding one digital input signal for producing said biasing signal, and a coupling diode connected to said biasing circuit and said gating diode for impressing said biasing signal on sad gating diode from said biasing circuit; an analogue output circuit for producing a variable output signal; a comparator circuit coupled to said decoding circuit means and to said analogue output circuit and responsive to said reference signal and to said variable output signal for producing control signals; and control means coupled to said analogue output circuit and said comparator circuit and responsive to said control signals for actuating said output circuit to vary the level of said variable output signal until said output signal has a level equal to that of said reference signal.

10. An electronic digital-to-analogue converter for converting a set of digital input signals to a corresponding analogue output signal; said converter comprising: a decoding circuit responsive to the set of digital input signals for producing an analogue reference signal corresponding to the value of the set of digital input signals; an analogue output circuit for producing a variable analogue output signal, said analogue output circuit including an energy storage circuit for storing a charge therein and for developing said variable output signal having a level at any instant proportional to the charge in said storage circuit at that instant, and charging and discharging circuits coupled to said energy storage circuit and responsive to charging and discharging signals for respectively charging and discharging said storage circuit to increase and to decrease the level of said variable output signal; a comparator circuit coupled to said decoding circuit and said analogue output circuit and responsive to said reference signal and said variable analogue output signal for producing a first and a second indicator signal when said reference signal is greater than and less than said variable analogue output signal; and a control circuit coupled to said comparator circuit and said analogue output circuit and responsive to said indicator signals for producing said charging and discharging signals and impressing them on said analogue output circuit.

11. An electronic converter for developing an analogue output signal corresponding to the total weight of N weighted digital input signals; said converter comprising: a decoding circuit responsive to the N digital input signals for producing a corresponding analogue reference signal, said decoding circuit including N current-weighting circuits and a common output, each of said current-weighting circuits being responsive to a corresponding one of the N digital input signals for developing an output current on said common output, the sum of the output currents produced by said N current-weighting circuits representing said analogue reference signal, each of said current-weighting circuits including a current switch and a set of resistors, said current switch being responsive to the corresponding digital input signal for gating an applied current to said resistor set, and said resistor set being connected between said current switch and said common output, each of said current switches including a biasing voltage circuit responsive to the corresponding digital input signals for producing a biasing voltage, a current-gating diode connected to said resistor set and responsive to said biasing voltage for selectievly gating said applied current to said resistor set, and a coupling diode connected between said biasing voltage circuit and said current-gating diode; an analogue output circuit including a storage capacitor for developing a variable output signal, and charging and discharging circuits coupled to said storage capacitor and responsive to charging and discharging signals for increasing and decreasing the level of said variable output signal; a comparator circuit coupled to said decoding circuit and said analogue output circuit and responsive to said reference signal and said variable output signal for comparing said reference signal with said output signal and for producing an indicator signal having a first and a second value representative of said reference signal being greater than and less than said analogue output signal; and a control circuit coupled to said comparator circuit and responsive to said indicator signal for producing said charging and said discharging signals, thereby to vary said variable output signal until said output signal is equal in magnitude to said reference signal whereupon said variable output signal constitutes the analogue output signal of the N weighted digital input signals.

12. An electronic conversion system for forming $k$ analogue output signals corresponding to $k$ sequentially applied sets of digital input signals, where $k$ is an integer, said system comprising: first means responsive to the $k$ sequentially applied sets of digital input signals for sequentially producing $k$ corresponding analogue reference signals; second means for producing the $k$ analogue output signals in response to $k$ control signals impressed thereon, said second means including $k$ output circuits, each of said output circuits being selectively operable in response to a corresponding one of said $k$ controls signals impressed thereon for producing a corresponding one of the $k$ analogue output signals, each of said output circuits including a charging-discharging circuit and an energy storage circuit, said charging-discharging circuit being operable in response to the control signals impressed thereon for charging said storage circuit to store said one of the analogue output signals; third means coupled to said first and second means and responsive to said reference signals and said analogue output signals for producing comparison signals indicating equality or inequality between each of the $k$ analogue output signals and its corresponding reference signal; and fourth means coupled to said second and third means and responsive to said comparison signals for producing said $k$ control signals and impressing them on respective ones of said $k$ output circuits.

13. A digital-to-analogue converter for converting a set of digital input signals to an analogue output signal, said converter comprising: an output circuit for directly generating an output signal; and means coupled to said output circuit and responsive to the set of digital input signals for varying the level of said output signal, said means including a decoding circuit responsive to the digital input signals for producing exclusively a corresponding reference signal having a level equal to the analogue equivalent of the digital input signals, a comparator circuit coupled to said decoding circuit and coupled directly to said output circuit and responsive directly to said reference signal and said output signal for producing comparison signals, and a control circuit coupled between said comparator circuit and said output circuit and responsive to said comparison signals for producing control signals and impressing them on said output circuit to vary the level of said output signal until the level of said output signal is equal to the level of said reference signal whereupon said output signal constitutes the analogue output signal.

References Cited in the file of this patent

UNITED STATES PATENTS

| | | |
|---|---|---|
| 2,537,427 | Seid | Jan. 9, 1951 |
| 2,538,615 | Carbrey | Jan. 16, 1951 |

OTHER REFERENCES

The Binary Quantizer, Electrical Engineering, pgs. 962–967, November 1949.